Mar. 13, 1923.
H. HEINE.
MICROSCOPE.
FILED MAY 21, 1921.
1,448,592.
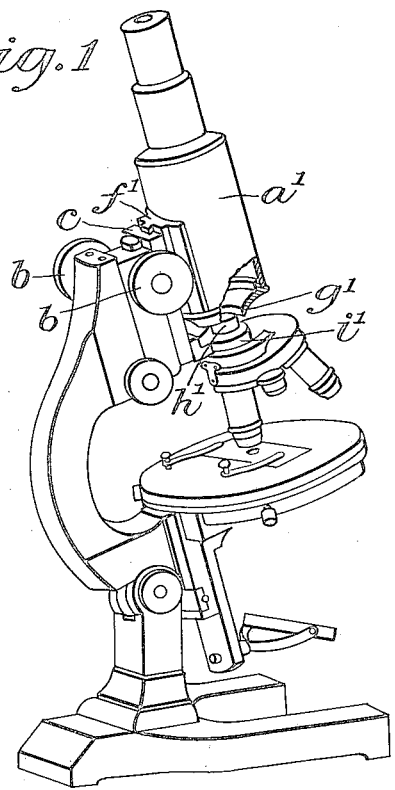
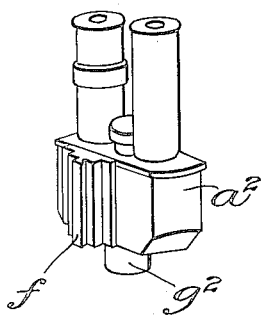
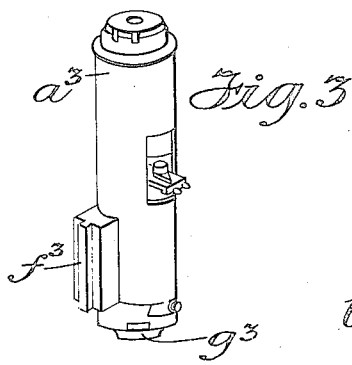
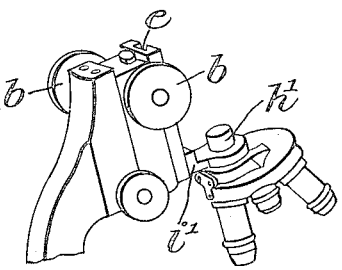
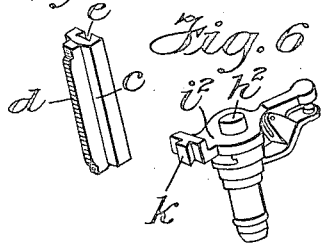
INVENTOR
Hermann Heine
BY
HIS ATTORNEYS Patented Mar. 13, 1923.

1,448,592

UNITED STATES PATENT OFFICE.

HERMANN HEINE, OF WETZLAR, GERMANY.

MICROSCOPE.

Application filed May 21, 1921. Serial No. 471,359.

*To all whom it may concern:*

Be it known that I, HERMANN HEINE, a citizen of the Republic of Germany, residing at Wetzlar, Germany, have invented an Improvement in Microscopes, of which the following is a specification.

This invention relates to microscopes and has for its object the construction of a microscope in which a plurality of observation tubes, for example a monocular tube, a binocular body, or a tube provided with a polarizing device can be readily interchanged on the stand without interfering with the objective or the focusing of the same.

In microscopes as usually constructed heretofore the objectives have been secured to the tube or body either directly by means of a screw-thread or through changing devices such as a revolving nose piece, or a slider, or a clutch changer. In such cases if the tube or microscope body has to be changed, either the tube and the objective fixed to it has to be removed from the stand or the objective first removed from the tube and then the tube taken away from the stand. If the same objective is required for use with another tube it has to be fitted thereto either before or after that tube is placed in position on the stand. This procedure takes a considerable amount of time particularly when the microscope is provided with a double or triple nose piece, and in any case an adjustment of the various tubes is necessary.

For binocular observation, for example, an auxiliary tube has been used and simply pushed into the monocular tube in place of the usual eyepiece or draw tube and naturally in such a case the application of the auxiliary tube has not interfered with the objective fitted on the end of the monocular tube. This method, however, is not capable of universal application for in many instances the interchangeable tubes or bodies are of different shapes and sizes.

In a microscope made according to the present invention various observation tubes or bodies can be readily interchanged on the stand without interfering with the objective or its holder which is fitted to the stand independently of the tube or body. Thus the objective may remain in its original position during the removal of one tube and the fitting of another tube, and the focusing arrangements may also, if desired, remain unchanged.

In carrying out my invention, the objective or the nose piece or other changing device may be fitted to a carrier adapted to engage with a member movable in any suitable manner for focusing purposes, and the interchangeable tubes provided with fittings which engage with the same member. Conveniently the carrier for the objective or nosepiece is also arranged so as to be readily interchangeable on the member with which it engages. These interchangeable parts need not necessarily carry the ordinary microscope objectives, but may carry other apparatus such for example as a magnifier, a microphotographic objective or a pair of Greenough objectives and, as in the case of the magnifier, the apparatus need not necessarily be used in conjunction with the tube or body.

A construction of apparatus according to this invention is illustrated by way of example in the accompanying drawings in which:—

Figure 1 is a view of a microscope having a monocular body tube removable from the stand independently of a revolving nose piece or objective carrier.

Fig. 2 shows an interchangeable binocular body tube.

Fig. 3 illustrates an interchangeable tube fitted with a polarizing device.

Fig. 4 shows the upper part of the limb of the stand illustrated in Fig. 1 with the body tube removed.

Fig. 5 is a separate view of the member to which the tubes and the objective carriers are independently fitted and Fig. 6 shows another form of objective carrier interchangeable with that shown in Fig. 1.

As illustrated in Figs. 1, 2 and 3, the body tubes $a'$ $a^2$ $a^3$ are interchangeable with one another and are arranged to fit into a socket member $c$ which is shown separately in Fig. 5. This socket member $c$ is provided with a rack $d$ for focusing purposes, the rack being moved in a well known way by a pinion operated by the thumb screws $b$. The socket member $c$ is provided with a dove-tailed groove $e$ into which fit similarly shaped projections $f'$ $f^2$ $f^3$ on the body tubes $a'$ $a^2$ $a^3$ respectively.

At the lower ends of the tubes $a'$ $a^2$ $a^3$ are provided tubular flanges $g'$ $g^2$ $g^3$ cooperating with smaller tubular flanges $h'$ $h^2$ on the objective carrier $i'$ $i^2$ to form light screens. To show the cooperation of these parts in Fig. 1 a portion of the tube $a'$ is broken away at its lower end.

Each objective carrier $i'$, $i^2$ has a dovetailed projection $k$ (Fig. 6) which fits into the lower part of the correspondingly shaped groove $e$ in the socket member $c$ so that the carriers can be interchanged in the same manner as the tubes $a'$ $a^2$ $a^3$. By way of example the objective carrier $i'$ is shown as provided with a revolving triple nose piece and the carrier $i^2$ (Fig. 6) with a clutch changer. Suitable stops, or clamping devices may also be employed to cause the tubes and the objective carriers to always occupy exactly the same positions relatively to the socket member $c$.

It will be noted that the construction herein described is such that the observation tube and the adjustably slidable socket member $c$ have longitudinally extended bearing surfaces which are held in engagement by the dove-tail connection between the two parts so that any tube used will be held in good optical alinement independently of the objective carrier, and there is no necessity for any special adjustment mechanism to effect such alinement. Also that, as the objective carrier is readily detachable from the slidable member $c$, this microscope can be used for such purposes as photography with wide angle objectives when the presence of the ring $l^2$ would interfere with the light required.

The drawings and specification disclose one specific embodiment of my invention and its several features of construction in some detail, but it is to be understood that, except as any of the appended claims may specify, the several constructional features need not necessarily be all employed together, and that details of construction may be varied considerably without departing from the essential characteristics of the invention.

I claim as my invention:

1. In a convertible microscope, a frame, a member slidably adjustable thereon, an observation tube, the member and tube having longitudinally disposed alinement surfaces and cooperating parts on the member and tube detachably engaging each other to hold said surfaces against each other.

2. In a convertible microscope, a frame, a member slidably adjustable thereon, an observation tube, the member and tube having cooperating surfaces, including retaining surfaces and longitudinally extended alinement surfaces.

3. In a convertible microscope, a frame, a member slidably adjustable thereon, an observation tube, the member and tube having engaging longitudinally disposed surfaces, including the surfaces of a dovetail projection inserted in a dovetail recess.

4. In a convertible microscope, a frame, a member slidably adjustable thereon, an observation tube attachable to and detachable from said member by longitudinal movement of the tube, the tube and member having extended alinement surfaces held against each other when the two parts are attached to each other.

5. In a convertible microscope, a frame, a member slidably adjustable thereon having an extended bearing surface and a recess and an observation tube carrying a cooperating bearing surface and a projection adapted to enter the recess and hold the bearing surfaces against each other.

6. In a convertible microscope, a frame, a member slidably adjustable thereon, an objective support carried by the member, an observation tube, the slidable member and tube having longitudinally disposed alinement surfaces and cooperating parts on the member and tube detachably engaging each other to hold the cooperating alinement surfaces against each other and permitting the removal of the tube without impairing the adjustment of the objective support.

7. In a convertible microscope, a frame, a supporting member slidably adjustable thereon an observation tube, the member and the tube having engaging longitudinally disposed alinement surfaces and also a projection on one entering in a dovetailed recess to detachably secure the tube in place, and an objective support independently carried by the supporting member and in alinement with the observation tube, the observation tube being removable independently of and without impairing the adjustment of the objective.

8. A convertible microscope comprising a supporting frame having a dovetail groove therein, a member having on one side thereof a dovetail projection slidably adjustable within said groove and on the other side means for receiving the support of an observation tube, an objective support carried by the adjustable member in operative relation to the microscopic mechanism, and an observation tube having a support which is readily receivable by and detachable from said receiving means on the adjustable member and is adapted to support the tube in alinement with the objective support and independently thereof whereby the tube may be readily removed and another tube with a similar support substituted on the adjustable member without impairing the original adjustment of the objective with relation to the microscopic mechanism.

9. In a convertible microscope, a frame, a supporting member slidably adjustable thereon, and carrying an observation tube having longitudinally disposed alinement surfaces and cooperating parts on the member and tube attachably engaging each other to hold said surfaces against each other and an objective support also carried by said supporting member but independently of the observation tube, the objective support and the supporting member having cooperating engaging parts for permitting the objective support to be removed independently of the observation tube.

10. A convertible microscope comprising a main frame having a dovetailed groove therein, a carrier mounted on said frame and having on one side thereof a dovetailed projection adjustably slidable in said dovetailed groove and on the other side means for receiving the support of an observation tube and the support of an objective, an objective support having a part which is readily receivable by and detachable from said receiving means on the carrier and is adapted to support the objective in operative relation to the microscopic mechanism and an observation tube having a support which is readily receivable by and detachable from said receiving means on the carrier and is adapted to support the tube in alinement with the objective and independently thereof, whereby either the tube or the objective support may be readily removed from the carrier independently of the other.

11. A convertible microscope comprising a main frame having a dovetailed groove therein, a carrier mounted on said frame and having on one side thereof a dovetailed projection adjustably slidable in said dovetailed groove and on the other side a dovetailed groove for receiving the support of an observation tube and the support of an objective, an objective support having a dovetail part which is readily receivable by and detachable from said groove on the carrier and is adapted to support the objective in operative relation to the microscopic mechanism and an observation tube having a dovetail part which is readily receivable by and detachable from said groove on the carrier and is adapted to support the tube in alinement with the objective and independently thereof, whereby either the tube or the objective support may be readily removed from the carrier independently of the other.

12. In a convertible microscope, a frame having an adjustably slidable member thereon, an objective carrier having a ring concentric with the optical axis and detachably secured to the slidable member, an observation tube and means, independent of the objective carrier, for detachably securing the observation tube in alining engagement with the longitudinal surface of the slidable member, enabling observation tubes and objectives to be changed independently and observation tubes to be employed without the presence of the objective carrier.

HERMANN HEINE.

Witnesses:
    FRIEDRICH ENGELMANN,
    EMIL MECHAN.